G. WESTINGHOUSE, Jr.

STEAM AND AIR BRAKE.

No. 6,948.

Reissued Feb. 22, 1876.

WITNESSES.

Claudius L. Parker

J. E. Boggs

INVENTOR

George Westinghouse Jr.
by George H. Christy
his Atty.

UNITED STATES PATENT OFFICE.

GEORGE WESTINGHOUSE, JR., OF PITTSBURG, PENNSYLVANIA.

IMPROVEMENT IN STEAM AND AIR BRAKES.

Specification forming part of Letters Patent No. 134,408, dated December 31, 1872; reissue No. 6,948, dated February 22, 1876; application filed December 18, 1875.

*To all whom it may concern:*

Be it known that I, GEORGE WESTINGHOUSE, Jr., of Pittsburgh, in the county of Allegheny and State of Pennsylvania, have invented a new and useful Improvement in Steam-Power Vacuum-Brake; and I do hereby declare the following to be a full, clear, and exact description thereof, reference being had to the accompanying drawing, making a part of this specification, in which—

Figure 1:
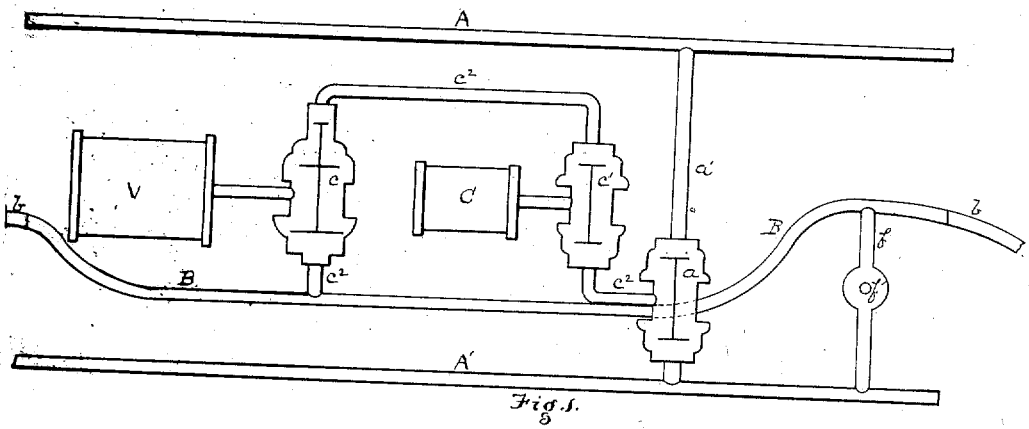
Figure 3:
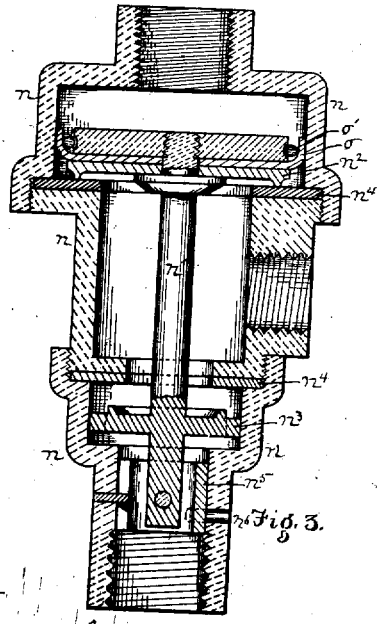
Figure 2:
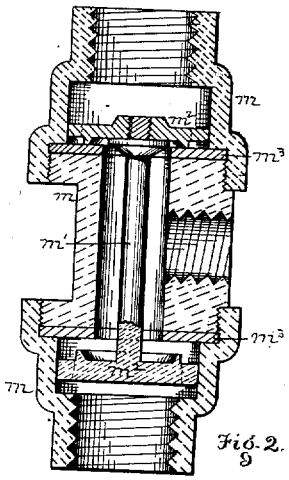

Figure 1 represents in outline my improved apparatus as attached to the under side of a car-body. Figs. 2 and 3 are enlarged sectional views of the valves and valve-boxes employed in the apparatus of Fig. 1.

Like letters of reference indicate like parts in each.

My invention relates, partly, to an improved arrangement of devices for and mode of applying the brakes on railway-cars by means of a vacuum or atmospheric pressure. To this end a vacuum, partial or complete, is created, as occasion requires, or is created and kept up in the brake-pipe or in a separate vacuum-chamber, or in both, and where such a vacuum is kept up, the construction is such that, by the accidental or intentional introduction of air into said vacuum-pipe, a communication will be opened from one or more of the other vacuum-spaces to the brake cylinder, whereby the brakes will be applied. It also relates to the arrangement of devices for communicating signals from any one part of the train to any other part in the same manner.

To enable others skilled in the art to make and use my improvement, I will proceed to describe its construction and mode of operation.

In Fig. 1, A A′ represents a double line of brake-pipes, extending from end to end of the car, and coupled to like lines of pipe on the contiguous car or cars. These I call the operating-pipes. B is a pipe also coupled at its ends, by suitable couplings or flexible tubes *b*, as hereinafter described, to a like line of pipe on the contiguous car or cars. This I call the vacuum-pipe. In it a vacuum or partial vacuum is always to be preserved, when the train is running, by means of any suitable pump, ejector, or other exhausting apparatus, preferably arranged on the locomotive or tender. V is the vacuum-chamber, and C the brake-cylinder, the latter having a piston with connections thence to the brake-levers, such that, by means of a vacuum or partial vacuum therein, the brakes will be applied to the wheels. If preferred, a flexible collapsing-cylinder may be used with a piston-stem attached to the movable head. The operating-pipes A A′ are connected by a pipe, $a^1$, having a valve-case and a double valve, *a*. From this valve-case, at a point between the valves, a pipe, $c^2$, passes around past the brake-cylinder C and vacuum-chamber V and opens into the pipe B. In it is the valve-case and double valve $c^1$, with a branch pipe from between the valves to the brake-cylinder C. It also has a valve-case, *c*, containing a triple valve, with a branch pipe from between the two larger of the valves to the vacuum-chamber V. The largest of these three valves is toward the vacuum-pipe B. The construction of the double valves *a* and $c^1$ is shown in Fig. 2. The case *m* has a pipe connection at each end. The stem $m^1$ has a valve, $m^2$, at each end. The valves are preferably of the kind known as wing-valves. They have a limited motion, and seat inwardly on the gum seats $m^3$. This double valve is substantially such as is described in Letters Patent No. 124,405, granted to me March 5, 1872. The triple valve *c*, Fig. 1, is shown in enlarged section in Fig. 3. It is shown in some of its features in the patent last named; but as to those features wherein it is novel, it will form a part of the subject-matter of another application. The case *n* has a pipe-connection at each end, and a side connection from between the two larger valves, which leads to the vacuum-chamber V. The stem $n^1$ carries a larger valve, $n^2$, a smaller valve, $n^3$, both of which seat inwardly on gum seats $n^4$, and a slide or ring valve, $n^5$, which covers and uncovers a port, $n^6$, leading to the external air. These three valves have a limited and common motion. The largest valve, $n^2$, has a cup-shaped packing-ring, *o*, pressed out by a wire or other suitable spring, *o′*. All the valves above referred to are arranged in the manner shown in outline in Fig. 1.

This apparatus, as already stated, is designed to bring atmospheric pressure to bear on one side of the piston of a brake-cylinder, by means of a vacuum on the other side. Such vacuum is either created by the exhaustion of air from some one of the pipes, or by a vacuum having been previously formed in the pipes or vacuum-chamber, or both. The brake-cylinder is brought into communication with the vacuum-space of the vacuum-pipe or vacuum-chamber, or both, by allowing atmospheric air to enter one of the pipes.

With reference to the drawing, this operation will be readily understood. If the air be exhausted from A, the lower valve of *a* will be closed, the upper one opened; the upper valve of $c^1$ will be closed and the lower one opened; the air will be exhausted from C, and the brakes be applied. If the air be exhausted from A′, the operation will be the same, except that the upper valve of *a* will be closed and the lower one opened. If the air be exhausted from B, the triple valve in *c* will be drawn over so as to unseat the largest valve and close the middle valve, at the same time opening the port $n^6$, whereby external air will be admitted to the pipe, $c^2$, and thence to the brake-cylinder C, so as to release the brakes, if they are already applied. The air in the vacuum-chamber V, will then compress the cup-shaped ring, *o*, Fig. 3, of this largest valve, and pass out around it, so as to create a vacuum in the chamber. A vacuum more or less perfect being thus kept up in the chamber V, if it be desired to apply the brakes independently of the pipes A A′, a cock may be turned to admit air into the pipe B, at the locomotive or elsewhere. By this, the largest valve in *c* will be closed, the middle valve opened, and the port $n^6$ will be covered by the third valve. The vacuum in V will then be operative on the double valve in $c^1$, so as to open the upper and close the lower valve, and thus open communication with the brake-cylinder C. The air in it will be partially exhausted into the vacuum thus created, which will result in applying the brakes.

In the patent granted to me March 5, 1872, No. 124,404, I described various means for applying the brakes, either intentionally or in case of accident, by opening a cock interposed between a reservoir of compressed air and the brake-cylinder. In the drawing I have shown such cock, *f′*, Fig 1, arranged in a pipe, *f*, which connects A or A′ with B. Any of the means referred to in the patent last named, and under any of the conditions there stated, may be employed to operate this cock. On its being opened, air will pass from A or A′ to B, with the result above stated. Also, I arrange an alarm on the locomotive in connection with the pipe A′ or A, so that when the cock *f′* is turned, the air, passing back, will operate such alarm or gage and communicate with the desired signal, as set forth in the patent last named.

In the air-brakes now in common use compressed air is employed which operates by pressure. In each of the couplings by which the brake-pipes are connected together a valve is arranged of such construction that when the couplings are united the valves will be unseated, so as to leave an open passage-way for the flow of the compressed air, and when the couplings are disconnected the pressure of the air in the pipes back of the valves will seat them, and thereby prevent the escape of the air.

By the term vacuum, as above used, I mean what is commonly known by that name, either a total or partial vacuum.

The devices described may be varied somewhat in arrangement, and all variations which secure the same function by substantially the same means I include in my invention.

What I claim as my invention, and desire to secure by Letters Patent, is—

1. In combination with the operating-pipes A A′, for creating or maintaining a vacuum, and a vacuum brake-cylinder, C, of suitable construction, a double-ended inwardly-seating valve, arranged to open communication with the pipe of greatest and cut off communication with the pipe of least vacuum pressure, substantially as set forth.

2. The mode of applying railway-car brakes by bringing an exhausted or vacuum chamber on the car into communication with a brake-cylinder on the same car, substantially as set forth.

3. The triple valve *c*, arranged relatively to and in combination with the pipe B, vacuum-chamber V, and brake-cylinder C, substantially as set forth.

4. The triple valve *c*, pipe B, vacuum-chamber V, and brake-cylinder C, in combination with the operating-pipe A′ or A and a connecting pipe, *f*, with cock *f′*, substantially as set forth.

In testimony whereof, I, the said GEORGE WESTINGHOUSE, Jr., have hereunto set my hand.

GEORGE WESTINGHOUSE, Jr.

Witnesses:
JAMES M. CHRISTY,
GEORGE H. CHRISTY.